(12) United States Patent
Shaio

(10) Patent No.: US 6,430,608 B1
(45) Date of Patent: Aug. 6, 2002

(54) METHOD AND APPARATUS FOR ACCEPTING AND REJECTING FILES ACCORDING TO A MANIFEST

(75) Inventor: Sami Shaio, Palo Alto, CA (US)

(73) Assignee: Marimba, Inc., Mountain View, CA (US)

( * ) Notice: Subject to any disclaimer, the term of this patent is extended or adjusted under 35 U.S.C. 154(b) by 0 days.

(21) Appl. No.: 09/247,199

(22) Filed: Feb. 9, 1999

(51) Int. Cl.[7] .............................................. G06F 15/16
(52) U.S. Cl. ....................................... 709/217; 709/229
(58) Field of Search ............................... 709/217, 218, 709/219, 230, 232, 227, 228, 229, 225; 707/200, 201, 203, 204, 10

(56) References Cited

U.S. PATENT DOCUMENTS

| | | | | |
|---|---|---|---|---|
| 4,999,766 A | * | 3/1991 | Peters et al. ................... 707/10 |
| 5,491,820 A | * | 2/1996 | Belove et al. ................... 707/3 |
| 5,937,411 A | * | 8/1999 | Becker ......................... 707/103 |
| 5,999,740 A | * | 12/1999 | Rowley ......................... 717/11 |

* cited by examiner

Primary Examiner—Dung C. Dinh
(74) Attorney, Agent, or Firm—Innovation Partners; Charles E. Gotlieb

(57) ABSTRACT

A method and apparatus checks a set of files against a manifest to determine whether to accept or reject the files. The manifest contains one or more policy sections that describe whether to accept files that are described in the manifest but not received, or received but not described in the manifest. The method and apparatus determines whether files are listed in the manifest but not received, or received but not listed in the manifest, and can accept the files in these circumstances based on the policy section of the manifest. The manifest may also contain a hash result for each file. The method and apparatus can hash the files received and compare the hash result produced with the hash result specified in the manifest. If the hash results computed for the file are different from the hash result for the file in the manifest, the file or the set of files may be rejected.

22 Claims, 5 Drawing Sheets

METHOD AND APPARATUS FOR ACCEPTING AND REJECTING FILES ACCORDING TO A MANIFEST

RELATED APPLICATIONS

The subject matter of this application is related to application Ser. No. 09/231,322 entitled, "System and Method for the Distribution of Code and Data" filed on Jan. 13, 1999 by Arthur van Hoff, Jonathan Payne and Sami Shaio, which is a continuation of application Ser. No. 08/690,257 entitled, "System and Method for the Distribution of Code and Data" filed on Jul. 24, 1996 by Arthur van Hoff, Jonathan Payne and Sami Shaio, now U.S. Pat. No. 5,919,247, each having the same assignee as this application and each is incorporated herein by reference in its entirety.

FIELD OF THE INVENTION

The present invention is related to file transfer software and more specifically to software for verifying proper receipt of transferred files.

BACKGROUND OF THE INVENTION

When multiple computer files are transferred, it may be helpful to verify that all files were properly received. Should a file be missing, or should an extra file be received, corrective measures may be taken only if some indication of the difference between what was sent and what was received is possible.

Manifests have been used to solve this problem. A manifest may contain a list of the filenames that are sent together. The sender of the files prepares the manifest and sends it with the files. The recipient can use the manifest to identify whether all files sent have been received, and to ensure no extra files are received, such as those that may contain computer viruses.

To ensure the integrity of the files sent and received, the sender can hash each of the files and include the result of each hash in the manifest. The recipient can also hash the files received and compare the hash result produced from the files received with that of the manifest.

If the hash results are the same, it is likely that the file received is identical to the file sent. Otherwise, the file received may be corrupt.

If either the wrong number of files are received, or the hash of the files does not match the hash results in the manifest, the files can be refused by the recipient, and the recipient may request the sender resend the files.

While a conventional manifest has application where the precise number of files is known in advance, in other circumstances, a conventional manifest may not be used. For example, it may be desirable in some circumstances to prepare a manifest containing a superset of-the files that will actually be sent. For example, if different language versions of a computer software application may be transmitted, it may be desirable to prepare a single manifest containing the names and hash results of all files that could be transmitted in all languages, but only transmit one language version of the application with the manifest. Some of the files listed in the manifest may not be transmitted. The recipient of a conventional manifest would reject such files as not precisely duplicating those listed in the manifest.

In other circumstances, it may be desirable to send additional files that are not listed in the manifest at all. For example, user-specific files, such as those that might contain data of an end user of a computer software application may utilize their own authentication techniques. Because each of these files can be unique to the user, including such files in the manifest would require a new manifest for each user. Because the manifest is hashed or otherwise signed by the supplier of the files to ensure integrity, it can be undesirable to trust an automated facility to hash a manifest for each user.

What is needed is a manifest that can allow files to be validated and authenticated that can be used in a wider variety of circumstances than a conventional manifest.

SUMMARY OF INVENTION

A method and apparatus compares the filenames of files received with the filenames received in a manifest. The manifest contains a policy section describing the rules used to accept or reject files received that may be inconsistent with the manifest. For example, files may be listed in the manifest, but not received, or may be received but not listed in the manifest. The policy section of the manifest may specify that all files are to be received even if some of the files are inconsistent, or that all files are to be received, but only if one type of inconsistency exists, such as files received that are not in the manifest. The manifest may contain hash results of each file to allow for detection in the conventional manner of corruption of files both received and listed in the manifest.

DETAILED DESCRIPTION OF A PREFERRED EMBODIMENT

Figure 1:
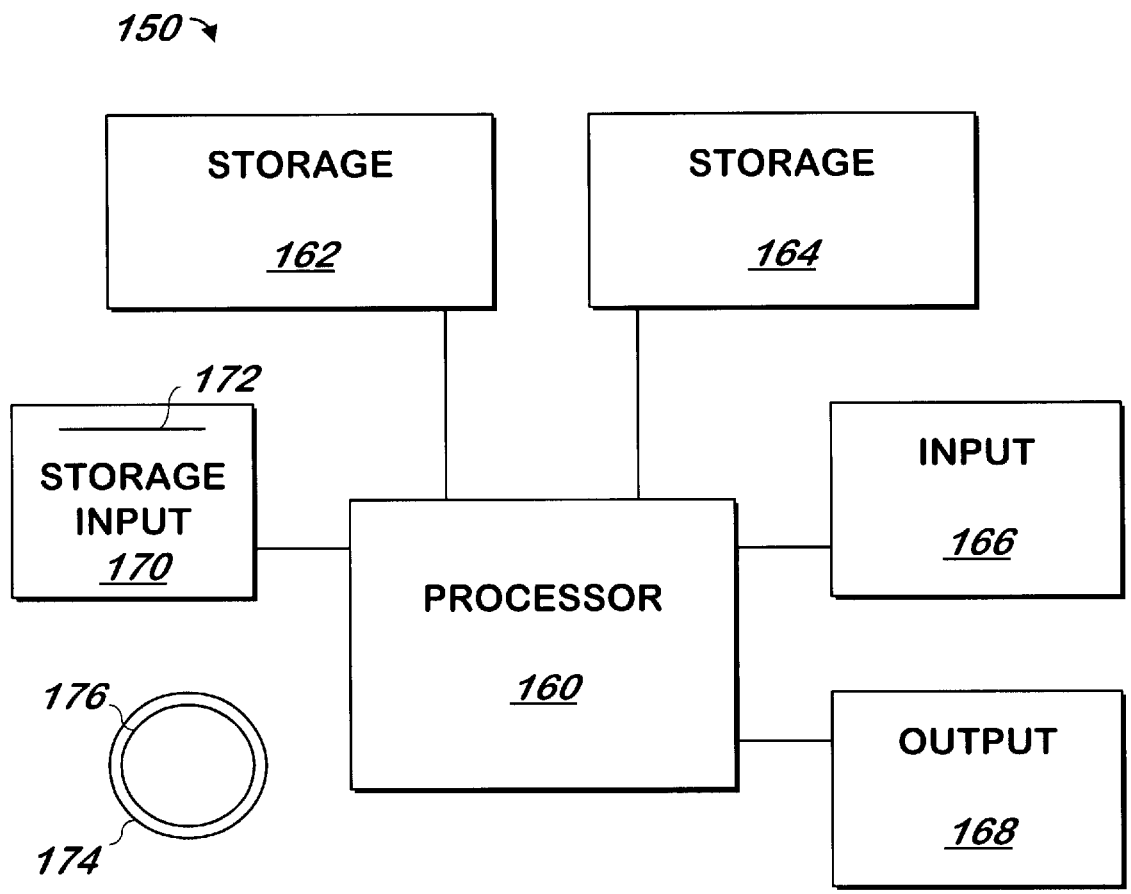
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Pentium-II personal computer such as the Dimension XPS D333 commercially available from Dell Computer Corporation of Round Rock, Tex., running the Microsoft Windows 98 operating system commercially available from Microsoft Corporation of Redmond, Washington, although other systems may be used.

Figure 2A:
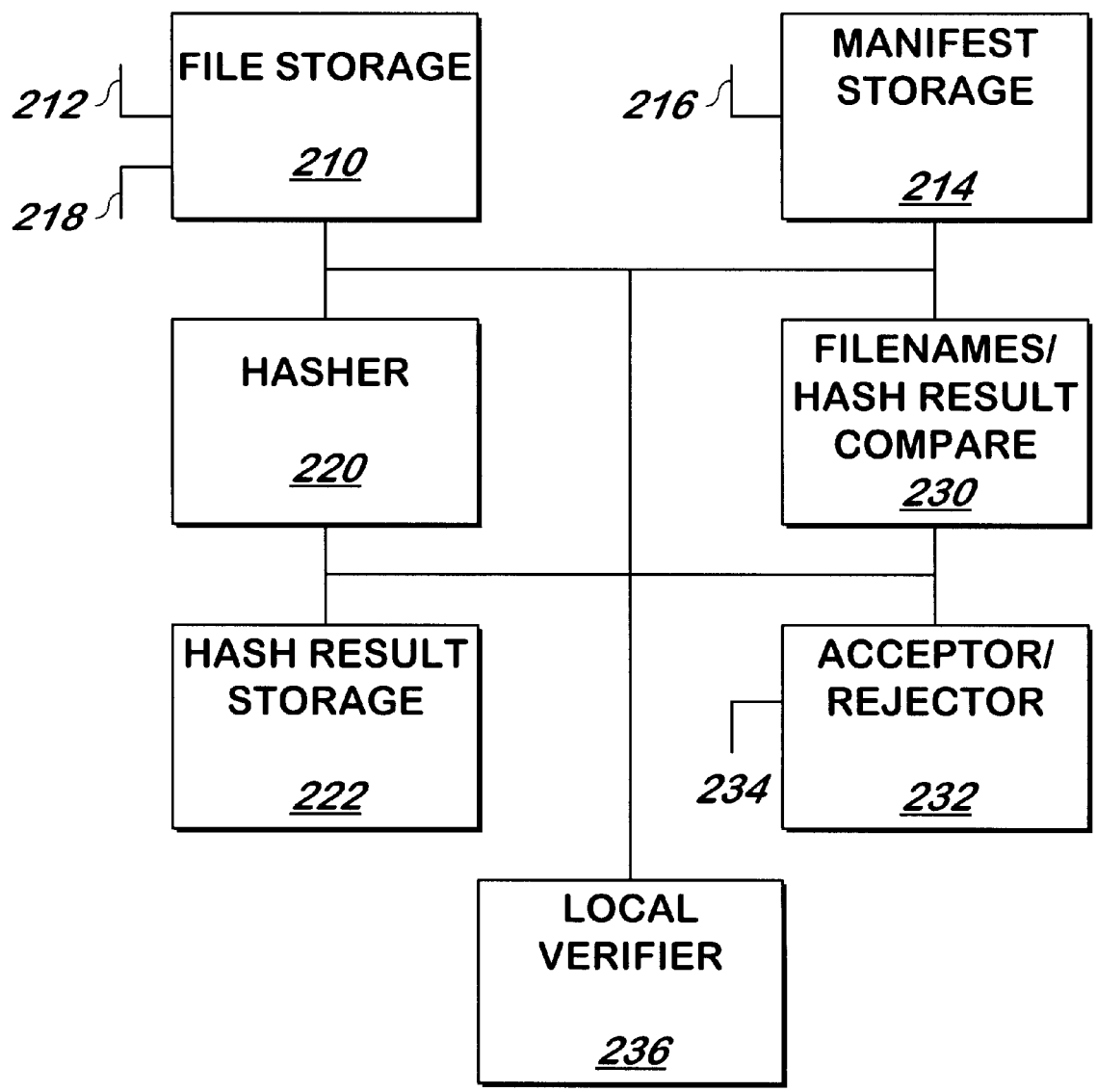
FIG. 2A is a block schematic diagram of an apparatus for accepting and/or rejecting files pursuant to a manifest according to one embodiment of the present invention.

Referring now to FIG. 2A, an apparatus for accepting files pursuant to a manifest is shown according to one embodiment of the present invention. File storage 210 receives a set of files and identifiers of the files, such as filenames, at input 212. Manifest storage 214 receives a manifest at input 216.

Figure 2B:
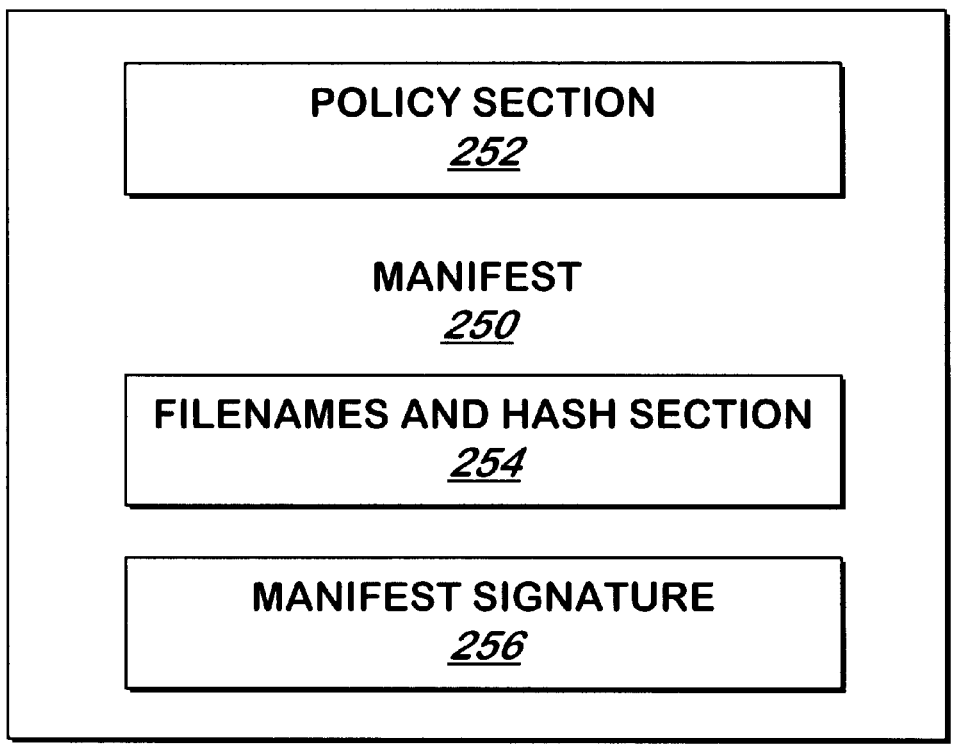
FIG. 2B is an illustration of a manifest according to one embodiment of the present invention.

Referring momentarily to FIG. 2B, a manifest 250 is shown according to one embodiment of the present invention. The manifest is a computer file, which in one embodiment, has the format described herein. The manifest 250 contains a policy section 252 that describes the policy used to accept or reject the files as described in more detail below. In one embodiment, the policy section 252 contains one of three values, "Exact_Match", "Proper_Subset_Match" or "Subset_Match", described in more detail below. The manifest 250 also contains a filenames and hash section 254, which contains the name or other identifier and the corresponding hash result for each of some or all of the set of files that will be transmitted in conjunction with the manifest.

Manifest 250 can also contain a signature 256 for the manifest 250 itself. Signature 256 contains a hash result of the remainder 252, 254 of the manifest 250 using one of the hash techniques described below, such as the hash technique used to create the hashes for the filenames and hash section 254.

Referring now to FIGS. 2A and 2B, acceptor/rejector 232 signals hasher 220 upon receipt of the manifest in manifest storage 214. Hasher 220 hashes, using one of the hash techniques described in more detail below, the policy section 252 and filenames and hash section 254 of the manifest 250 received and provides the result to acceptor/rejector 232. Acceptor/rejector 232 reads the manifest signature 256 in the manifest stored in manifest storage 214 and compares that signature with the hash result received from hasher 220. If the signature matches the hash result, acceptor/rejector 232 signals hasher 220 to continue as described below, and otherwise, acceptor/rejector 232 rejects as described below the manifest 250 stored in manifest storage 214 and/or the set of files in file storage 210.

Hasher 220 retrieves each file and filename stored in file storage 210 and hashes the content of the files stored in file storage 210. The hash used by hasher 220 may be any hash algorithm such as SNERFU, N-Hash, MD2, MD4, MD5, any of the SHA algorithms, RIPE-MD, HAVAL or any other hash algorithm, and should be the same as the algorithm used to create the hash results in the filenames and hash section 254 of manifest 250. It can be better to select a hash algorithm that is "cryptographically strong." Such an algorithm has a low probability of hashing two different inputs to the same output.

A different algorithm from that used to build the manifest could be used if it was possible to determine with near certainty that the file received at input 212 was unchanged from the file hashed to build the manifest stored in manifest storage 214. Hasher 220 stores into hash result storage 222 the filenames it retrieves from file storage 210 and hash results it produces for each of the files in file storage 210. Hasher signals Filename/hash result compare 230.

Filename/hash result compare 230 compares each of the filenames and hash results stored in hash result storage 222 with the filenames and hash results contained in the filenames and hash section 254 of the manifest stored in manifest storage 214. In one embodiment, filename/hash result compare 230 arranges the filenames into four groups.

Group number one corresponds to filenames that are in both manifest storage 214 and hash result storage 222 and for which the respective hashes match one another. Group number two corresponds to filenames and/or hashes that are in both manifest storage 214 and hash result storage 222 and for which the respective hashes do not match one another. Group three contains the filenames and/or hashes that are in hash result storage 222 but not in manifest storage 214. Group four contains the filenames and/or hashes that are in manifest storage 214 but not in hash result storage 222. It is noted that filenames in hash result storage 222 correspond to files received in file storage 210 in one embodiment, and thus these descriptions can be used interchangeably with respect to a criteria for a group in other embodiments described below.

As described herein, filenames are used to identify files, however other identifiers, such as the hash result combined with a date and/or time associated with the file may also be used as an identifier of a file in the set of files received.

Filename/hash result compare 230 maintains information about each group at least sufficient to allow acceptor/rejector 232 to determine whether no filenames correspond to a particular group as described below. This information may be maintained in many ways. In one embodiment, the filenames corresponding to each group are physically arranged, for example, by placing the filenames in one of four lists, with each list corresponding to one group. Filename/hash result compare 230 determines the group of each file using the rules set forth above and copies the filename of the file from either hash result storage 222 or from the manifest in manifest storage 214 into the proper list.

To determine the group of each file, filename/hash result compare 230 uses the following technique in one embodiment. The first file listed in the filenames and hash section 254 of the manifest 250 stored in manifest storage 214 is selected and compared with the list of files stored in hash result storage 222. If the filename exists in both of these places 214, 222, the filename in the hash result storage 222 is marked as having been matched, and the hash results from these same two places 214, 222 are compared. If the hash results match, the filename is placed into the list for group one, otherwise, the filename is placed into list for group two. If the filename is not located in both places, the filename is placed into the list corresponding to group four. The next filename in the manifest is selected and the process above is repeated until all filenames in the manifest have been processed in this manner. When all such filenames have been so processed, the filenames in hash result storage 222 not marked as having been matched are copied into the list corresponding to group three.

In another embodiment of the present invention, the number of filenames or files meeting the criteria of each group are maintained by filename/hash result compare 230. In still another embodiment, filename/hash result compare 230 maintains for each group an indication of the existence of filenames or files meeting the criteria of the group. Whatever information is maintained for each group is provided by filename/hash result compare 230 to acceptor/rejector 232.

In one embodiment, acceptor/rejector 232 signals local verifier 236 with the filenames or other identifiers of files in group three, that is, files received for which no corresponding entry in the manifest exists. In such embodiment, local verifier 236 attempts to verify the integrity of the file "locally" using rules that may be specified or identified in the policy section 252 of the manifest 250 stored in manifest storage 214 (e.g. run a specified one of the received files as an application and supply the file in group three as an input, and the application will verify the integrity of the file in group three and report back to local verifier 236 or verify the integrity of the file by hashing the file except for a signature at the end of the file by using a specified algorithm such as one of the algorithms described above, and then comparing the hash result with the signature). Local verifier 236 uses any specified rule to attempt to locally verify each file in group three. Local verifier 236 transfers the filenames or otherwise redesignates each of the files so verified from group three to group one by informing acceptor/rejector 232 or by physically adjusting or directing filenames/hash result compare 230 to adjust the grouped list of files. Filenames that do not have rules specified remain in group three. Filenames that have rules specified but for which the local verification process fails are moved to group two in the same manner as that used to move filenames to group one.

Acceptor/rejector 232 receives the information described above from filename/hash result compare 230 and reads the policy section in the manifest stored in manifest storage 214. Acceptor/rejector 232 makes a determination whether to accept or reject the files in file storage 210 based on the existence of any filenames in one of the four groups and the policy section 252 of the manifest 250 stored in manifest storage 214. Acceptor/rejector 232 uses the information for each group it receives from filename/hash result compare 230 to determine whether a group has any members.

In one embodiment, acceptor/rejector 232 rejects the set of files and/or the manifest received if any files or filenames meet the requirements of group two, for any value of the policy section 252. In addition, if the policy section 252 has a value of Exact_Match, acceptor/rejector 232 will reject the files in file storage 210 upon the existence of any files or filenames in group three or four. Acceptor/rejector 232 will also reject the files stored in file storage 210 if the policy section has a value of Proper_Subset_Match upon the existence of any file or filenames in group four. Acceptor/rejector 232 can use other rules for rejecting files based on other designations in policy section 252.

If acceptor/rejector 232 rejects the files and/or manifest as described above, acceptor/rejector 232 may take any number of actions, including sending a message (for example to the sender of the set of files, manifest or both) via output 234 to request retransmission of the files, signaling file storage 210 to delete the files it stores or signaling manifest storage 214 to delete the manifest it stores. In one embodiment, acceptor/rejector 232 provides at output 234 an explanation of why it rejected the files along with the request for retransmission it provides. For example, if filename/hash result compare 230 stores the filenames in lists as described above, the explanation can include the filenames of the files causing the rejection.

In one embodiment, only the offending files are rejected, and the request for retransmission includes only the filenames causing the rejection. In such embodiment, only the offending files are deleted from file storage 210 as described above. In another embodiment, all the files in file storage 210 are accepted or rejected together.

If acceptor/rejector 232 does not reject the files, then it accepts the files. Acceptor/rejector 232 may take any number of actions after it accepts the files, including signaling file storage 210 to output the files at output 218, signaling other processes (not shown) to retrieve the files from file storage 210 or signaling manifest storage 214 to delete the manifest. In one embodiment, filename/hash result compare 230 signals manifest storage 214 to delete the manifest as soon as it completes its operation as described above, instead of acceptor/rejector 232 providing this signal as described above.

In other embodiments of the present invention, acceptor/rejector 232 reads the policy section 252 before filename/hash result compare compares the filenames and hash results. Acceptor/rejector 232 translates the value in the policy section into the group numbers for which the set of files is to be received. Acceptor/rejector 232 passes this information to filename/hash result compare 230. Filename/hash result compare 230 then processes the filenames and checksums as described above until a file is determined to be in a group for which the set of files are to be rejected. Filename/hash result compare 230 then stops processing the files, and reports to acceptor/rejector 232 that a file in such a group has been located so that acceptor/rejector can reject the files as described above without filename/hash result compare having to process the remaining files. If no such filenames are located, filename/hash result compare 230 reports the status to acceptor/rejector 232 so that acceptor/rejector 232 may accept the files as described above.

In still another embodiment, hasher 220 does not hash the files before filename/hash result compare 230 begins placing the files into the proper groups. Instead, using only the filenames, filename/hash result compare 230 segregates the files into groups two, three or four and signals hasher 220. Hasher 220 then hashes the files in group two and signals filename/hash result compare 230. Filename/hash result compare 230 then uses the hash results to move some or all of the files from group two to group. one, depending on whether the hash results calculated match those in the manifest. This allows operation of the present invention without computing hash results for files corresponding to group three.

Figure 2C:
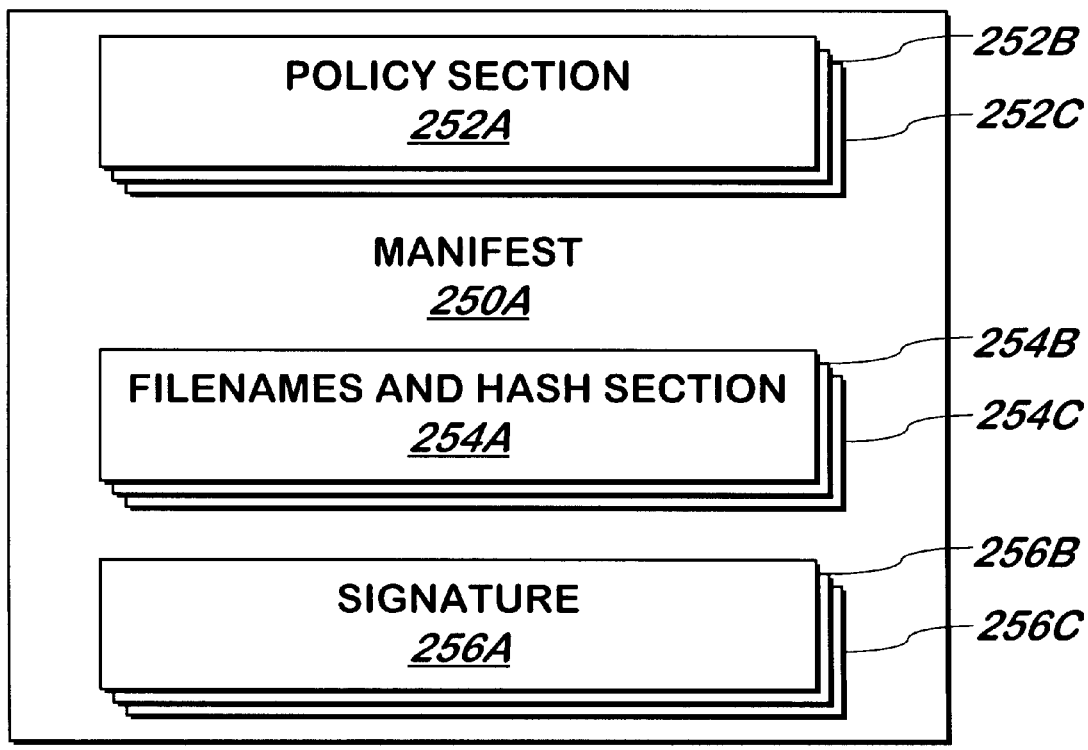
FIG. 2C is an illustration of a manifest according to another embodiment of the present invention.

In one embodiment shown in FIG. 2C, there are multiple sets of policy sections 252A, 252B, 252C and filenames and hash sections 254A, 254B, 254C in the manifest 250A. Files are accepted or rejected as described above using the policy section 252A, 252B, 252C corresponding to each of the filenames and hash sections 254A, 254B, 254C, respectively, as described in more detail below.

If desired, each set of files 252A, 252B or 252C and the corresponding policy section 254A, 254B or 254C may have its own signature 256A, 256B, 256C or there may be a single signature for the entire manifest 250A as described above with reference to FIG. 2B. The use of different signatures can allow several parties to contribute to the set of files and the manifest 250A, whereby each party signs its own portion of the manifest.

If desired, an overall signature for the entire manifest 250A may also be added to the manifest by the party that supplies it to ensure no unauthorized changes to the manifest 250A and the set of files are made. The overall signature is supplied by hashing all policy sections 252A, 252B, 252C, filenames and hash sections 254A, 254B, 254C, and all signatures 256A, 256B, 256C or portions thereof, and supplying the overall signature with the manifest 250A. In such embodiment, hasher 220 hashes all policy sections 252A, 252B, 252C, filenames and hash sections 254A, 254B, 254C, and all signatures 256A, 256B, 256C or portions thereof and acceptor/rejector 232 compares the result with the overall signature supplied with the manifest 250A. If they do not match, the manifest 250A and/or set of files is rejected by acceptor/rejector 232. Otherwise, acceptor/rejector 232 signals hasher 220 which hashes each of the policy sections 252A, 252B, 252C, filenames and hash sections 254A, 254B, 254C, and provides the results to acceptor/rejector 232. Acceptor/rejector 232 compares the hash results with each corresponding signature 256A, 256B, 256C and rejects the files and/or manifest 250A if any discrepancy between the hash result and the corresponding signature is noted. In one embodiment, only the files pertaining to the individual filenames and hash section 254A, 254B or 254C for which the discrepancy is noted are rejected by acceptor/rejector 232.

Figure 3A:
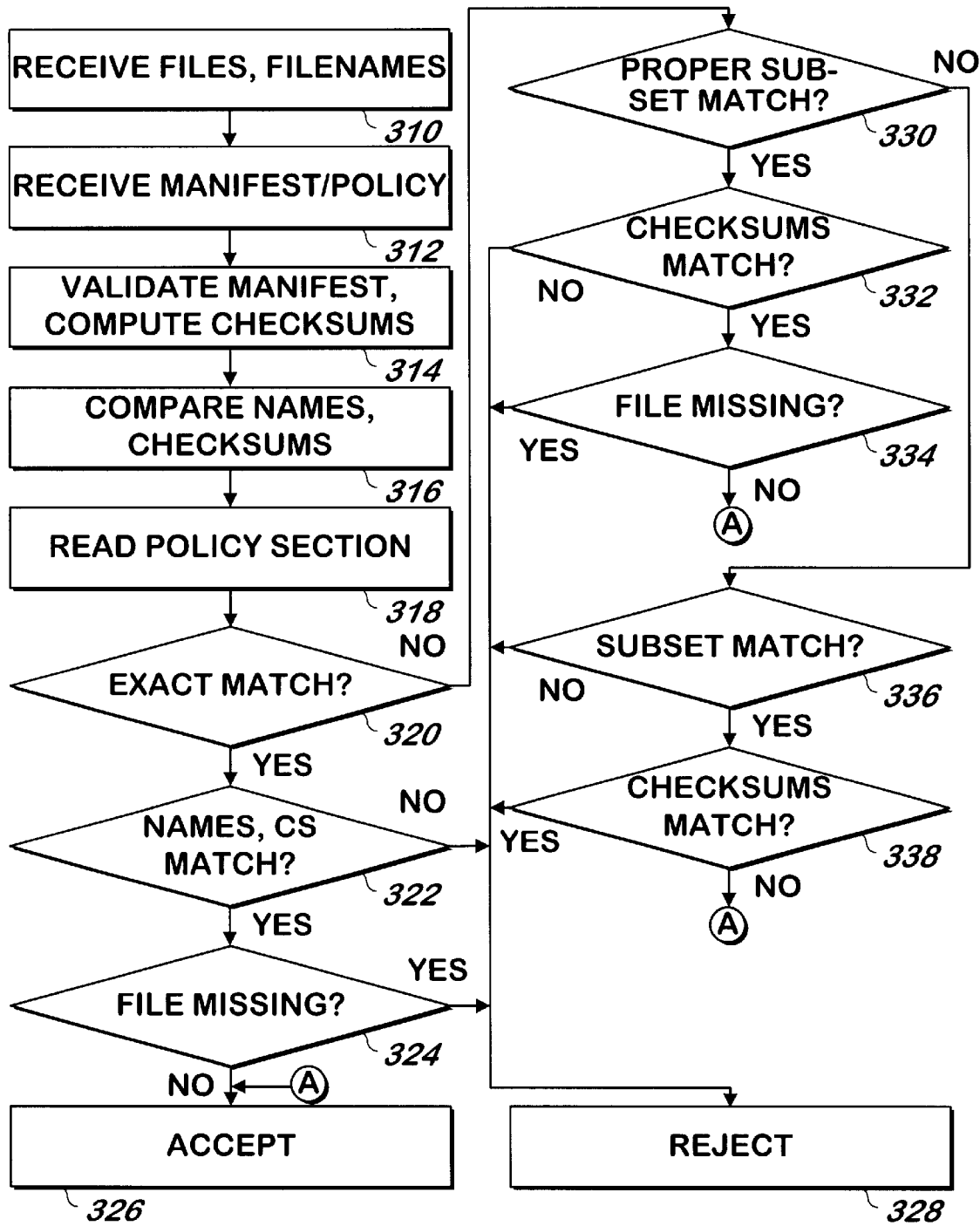
FIG. 3A is a flowchart illustrating a method of accepting and/or rejecting files according to a manifest according to one embodiment of the present invention.

Referring now to FIG. 3A, a method of accepting or rejecting files according to a manifest is shown according to one embodiment of the present invention. A set of one or more files is received 310, along with the filenames of the files. A manifest is received 312 such as one of the manifests describe above. The manifest may be received as a single file or in separate parts.

The manifest is validated as described above 314. The manifest may be validated by hashing some or all of it and comparing the result to a signature of the manifest as described above. If the comparison does not result in a match, the manifest and/or set of files are rejected 328. Otherwise, step 314 continues.

Each of the files are hashed as described above to produce a result, referred to as a checksum 314. The checksum may contain a conventional hash result as well as the identifier of the file. The names of the files received in step 310 are compared 316 with the filenames received in the manifest in step 312. The checksums of those filenames corresponding to the files received in step 310 that match any filenames in the manifest are compared 316 with the corresponding checksum in the manifest as described above, and the name of the files received in step 310 and the names of other files contained in the manifest received in step 312 are assigned 316 to one of four groups as described above, although other numbers (higher or lower than four) of groups may be used.

In one embodiment, step 316 is performed in substeps. The names of the files received in step 310 are compared to those received in the manifest in step 312. Matching files are placed into group two, with the other filenames placed into groups 3 or 4 as described above. This portion of step 316 is performed before step 314. Step 314 is then performed only on the files in group two. The remainder of step 316 compares the checksums produced in step 314 with those received in the manifest in step 312 for the files corresponding to the filenames in group two. Those filenames having matching checksums are moved from group two to group one.

The policy section of the manifest received in step 312 is read 318. If the policy section indicates an exact match is not required 320, the method continues at step 330. If the policy section indicates an exact match is required 320, then if the names and checksums received in the manifest match 322 the names received in step 310 and the checksums computed in step 314, and none of the filenames received in the manifest in step 312 are missing 324 from the files/filenames received 310 and vice versa, the set of files are accepted 326, otherwise, the set of files are rejected 328.

If the policy section indicates a proper subset match is not required 330, the method continues at step 336. If the policy section indicates a proper subset match is required, 330, then if for all files in group two, the checksum for a file in both the manifest received in step 312 and the checksum for the same file computed in step 314 match 332, all files specified in the manifest received in step 312 were received 334 in step 310, the set of files are accepted 326, otherwise, the set of files are rejected 328.

If the policy section indicates a subset match is required, 336, then, for all files that were received in step 310 and listed in the manifest received in step 312, if the checksums calculated in step 314 match 338 the checksums received in the manifest in step 312, the set of files are accepted 326, otherwise, if a proper subset match was required, the set of files are rejected 328.

Figure 3B:
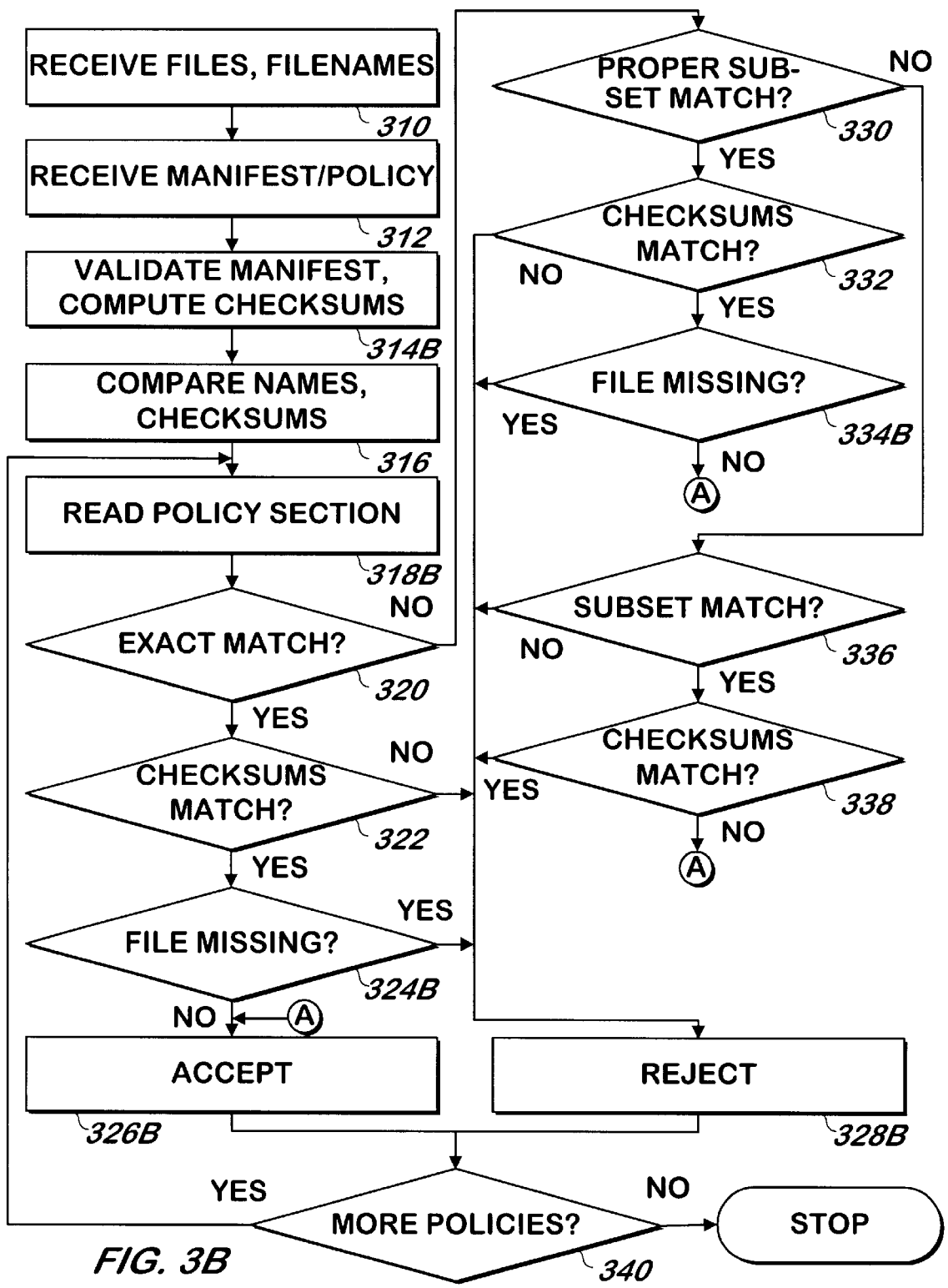
FIG. 3B is a flowchart illustrating a method of accepting and/or rejecting files according to a manifest having multiple policy sections according to an alternate embodiment of the present invention.

If the manifest received in step 312 contains multiple policies, the method of FIG. 3B is used. The method of FIG. 3B operates as described above with respect to FIG. 3A with the following exceptions. Validation of the manifest in step 314 is performed as described above with reference to the manifest of FIG. 2C and the set of files and/or manifest may be rejected as described above. The accept and reject steps 326, 328 apply only to the files in the filenames and hash section corresponding to the policy section read in step 318. After the accepting step 326 or rejecting step 328, if additional policy sections exist in the manifest, the next policy section in the manifest is read in the subsequent iteration of step 318. In such embodiment, members of group four would be calculated in step 316 for each filenames and hash section, and the relevant steps 324, 334 would be applied only against the existence of those group four members according to the corresponding policy section. The relevant steps 324, 334 are only applied against the existence of group three members for the last policy section or for other policy sections. Policy sections could specify that rejection applies only to the files listed in the corresponding filenames and hash section or to all files received. These differences are illustrated in FIG. 3B with reference numerals having a suffix of 'B' e.g. 314B instead of 314.

In one embodiment, the present invention is incorporated in a tuner described in the copending parent applications, although it may be used in other applications unrelated to the copending parent applications.

What is claimed is:

1. An apparatus for accepting a set of files, the apparatus comprising:

a filename/hash result compare having an first input operatively coupled to receive a first list of identifiers, describing a set of files potentially received in conjunction with the first list and a second input operatively coupled to receive a second list of identifiers corresponding to a set of a plurality of files actually received by the apparatus, the filename/hash result compare for identifying and indicating at an output an existence of an identifier in exactly one of the first list and the second list; and an acceptor/rejector having a first input coupled to the filename/hash result compare output, the acceptor/rejector for signaling at an output acceptance of the set of files responsive to the acceptor/rejector first input indicating the existence of an identifier in exactly one of the first list and the second list.

2. The apparatus of claim 1, wherein:

the acceptor/rejector additionally has a second input operatively coupled to receive a policy indicating conditions for accepting at least some of the set of files; and the acceptor/rejector signals at the output acceptance of the set of files responsive to the acceptor/rejector first input indicating the existence of an identifier in exactly one of the first list and the second list and the policy received at the acceptor/rejector second input.

3. The apparatus of claim 2, additionally comprising:

a hasher having an input operatively coupled to receive at least one of the set of files, the hasher for hashing each of said at least one file in the set of files to produce a first set of at least one hash result, and for providing said first set of at least one hash result at an output; and wherein:

the filename/hash result compare additionally comprises a third input coupled to the hasher output for receiving the first set of at least one hash result and a fourth input for receiving a second set of at least one hash result, the filename/hash result compare additionally for identifying and indicating at the output an existence of a hash result in exactly one of the first set and the second set; and the acceptor/rejector signals at the output acceptance of the set of files additionally responsive to the existence of a hash result in exactly one of the first set and the second set.

4. The apparatus of claim 3, wherein each hash result in the first set of hash results and the second set of hash results comprises a hash result and a second identifier of the file from which the hash result was generated.

5. A method of accepting a set of files, the method comprising:

receiving the set of files comprising an identifier and content;

receiving a manifest comprising an identifier for each of a first plurality of the set of files;

identifying a first set of at least one of the identifiers, the first set comprising at least one of:
at least one identifier of at least one file identified on the manifest as being potentially received in conjunction with the manifest and not received in the set of files; and
at least one identifier of at least one file received in the set of files and not identified on the manifest; and
accepting at least one of the set of files.

6. The method of claim 5, wherein the accepting step comprises accepting substantially all of the set of files.

7. The method of claim 5, wherein:

the manifest additionally comprises at least one policy; and accepting the set of files is responsive to the at least one policy.

8. The method of claim 7, wherein the policy has a first state and a second state, and the accepting step is responsive to:

the policy in the first state and the identifying step identifying at least one identifier of at least one file identified on the manifest as being potentially received in conjunction with the manifest and not received in the set of files in the first set of at least one identifier; and the policy in the second state and the identifying step identifying at least one identifier of at least one file received in the set of files and not identified on the manifest in the first set of at least one identifier.

9. The method of claim 5, wherein thee manifest additionally comprises a first set of at least one hash result for at least one file of the set of files, the method additionally comprising:

computing a second set of at least one hash result for at least one file of the set of files received; and wherein the accepting step is additionally responsive to a hash result in exactly one of the first set of at least one hash result and the second set of at least one hash result.

10. The method of claim 7, comprising the additional step of rejecting at least one of the set of files responsive to the policy.

11. The method of claim 10, wherein the rejecting step comprises deleting at least one of the set of files.

12. The method of claim 10, wherein the rejecting step comprises requesting retransmission of the at least one of the set of files rejected.

13. The method of claim 7, wherein the accepting step comprises providing the set of files.

14. A computer program product comprising a computer useable medium having computer readable program code embodied therein for accepting a set of files, the tsar computer program product comprising:

computer readable program code devices configured to cause a computer to receive the set of files comprising an identifier and content;

computer readable program code devices configured to cause a computer to receive a manifest comprising an identifier for each of a first plurality of the set of files;

computer readable program code devices configured to cause a computer to identify a first set of at least one of the identifiers the first set comprising at least one of:
at least one identifier of at least one file identified on the manifest as being potentially received in conjunction with the manifest and not received in the set of files; and
at least one identifier of at least one file received in the set of files and not identified on the manifest; and computer readable program code devices configured to cause a computer to accept at least one of the set of files.

15. The computer program product of claim 14, wherein the computer readable program code devices configured to cause a computer to accept comprise computer readable program code devices configured to cause a computer to accept substantially all of the set of files.

16. The computer program product of claim 14, wherein:

the manifest additionally comprises at least one policy; and the computer readable program code devices configured to cause a computer to accept the set of files are responsive to the at least one policy.

17. The computer program product of claim 16, wherein the policy has a first state and a second state, and the computer readable program code devices configured to cause a computer to accept are responsive to:

the policy in the first state and the computer readable program code devices configured to cause a computer to identify identifying at least one identifier of at least one file identified on the manifest as being potentially received in conjunction with the manifest and not received in the set of files in the first set of at least one identifier; and the policy in the second state and the computer readable program code devices configured to cause a computer to identify identifying at least one identifier of at least one file received in the set of files and not identified on the manifest in the first set of at least one identifier.

18. The computer program product of claim 14, wherein the manifest additionally comprises a first set of at least one hash result for at least one file of the set of files, the computer program product additionally comprising:

computer readable program code devices configured to cause a computer to compute a second set of at least one hash result for at least one file of the set of files received; and wherein the computer readable program code devices configured to cause a computer to accept are additionally responsive to a hash result in exactly one of the first set of at least one hash result and the second set of at least one hash result.

19. The computer program product of claim 16, additionally comprising computer readable program code devices configured to cause a computer to reject at least one of the set of files responsive to the policy.

20. The computer program product of claim 19, wherein the computer readable program code devices configured to cause a computer to reject comprise computer readable program code devices configured to cause a computer to delete at least one of the set of files.

21. The computer program product of claim 19, wherein the computer readable program code devices configured to cause a computer to reject comprise computer readable program code devices configured to cause a computer to request retransmission of the at least one of the set of files rejected.

22. The computer program product of claim 16, wherein the computer readable program code devices configured to cause a computer to accept comprise computer readable program code devices configured to cause a computer to provide the set of files.

* * * * *